(12) United States Patent
Hoen et al.

(10) Patent No.: US 6,906,838 B2
(45) Date of Patent: Jun. 14, 2005

(54) SYSTEMS AND METHODS FOR ROUTING OPTICAL BEAMS ALONG OPTICAL PATHS USING STEERABLE MIRRORS

(75) Inventors: Storrs Townsend Hoen, Brisbane, CA (US); Jonah Alexander Harley, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 159 days.

(21) Appl. No.: 10/621,880

(22) Filed: Jul. 17, 2003

(65) Prior Publication Data

US 2005/0013619 A1 Jan. 20, 2005

(51) Int. Cl.[7] ............................................. G02B 26/08
(52) U.S. Cl. ...................... 359/201; 359/204; 359/900; 250/216
(58) Field of Search ................................ 359/201, 204, 359/198–199, 618, 900; 385/15–18; 250/216, 234–235

(56) References Cited

U.S. PATENT DOCUMENTS

| 5,177,348 | A | 1/1993 | Laor |
| 5,524,153 | A | 6/1996 | Laor |
| 6,215,222 | B1 | 4/2001 | Hoen |
| 6,253,001 | B1 | 6/2001 | Hoen |
| 6,842,553 | B2 * | 1/2005 | Richardson .................. 385/17 |

* cited by examiner

Primary Examiner—James Phan

(57) ABSTRACT

Methods for routing optical beams are provided. One such method for routing a first optical beam comprises: providing a first mirror and a second mirror, both of which are steerable; providing a second optical beam; propagating the first optical beam such that the first optical beam is reflected by the first mirror prior to being reflected by the second mirror; propagating the second optical beam such that the second optical beam is reflected by the second mirror prior to being reflected by the first mirror; and orienting the first mirror and the second mirror such that the first and second optical beams are coincident at both the first mirror and the second mirror. Systems also are provided.

19 Claims, 8 Drawing Sheets

SYSTEMS AND METHODS FOR ROUTING OPTICAL BEAMS ALONG OPTICAL PATHS USING STEERABLE MIRRORS

BACKGROUND

Various control systems have been used for switching optical beams transmitted via optical fibers. By way of example, some of these control systems align a primary optical beam within an optical switch using a secondary control beam. The secondary control beam propagates parallel to, but is laterally offset from, the primary optical beam. Unfortunately, these control systems can be limited by several factors. For instance, because the secondary control beams are laterally offset from their corresponding primary optical beams, regions of the optical switches that could otherwise be used for additional input and output ports are devoted to detectors for detecting the secondary control beams. Additionally, low-loss coupling into single mode optical fiber requires precise positioning of the primary optical beams. Therefore, any angular misalignment between the secondary control beams and the primary optical beams can affect loss of the primary optical beams.

SUMMARY

Systems and methods for routing optical beams are provided. An exemplary method for routing a first optical beam comprises: providing a first mirror and a second mirror, both of which are steerable; providing a second optical beam; propagating the first optical beam such that the first optical beam is reflected by the first mirror prior to being reflected by the second mirror; propagating the second optical beam such that the second optical beam is reflected by the second mirror prior to being reflected by the first mirror; and orienting the first mirror and the second mirror such that the first and second optical beams are coincident at both the first mirror and the second mirror.

An exemplary system for routing a first optical beam comprises: a first steerable mirror; a second steerable mirror located to communicate optically with the first steerable mirror; and a controller operable in response to information indicating respective positions of incidence of first and second optical beams on each of the first and second steerable mirrors and to provide control signals to orient the first and second steerable mirrors to locate the first and second optical beams coincidentally at both the first and second steerable mirrors.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Additionally, reference numerals designate corresponding parts throughout the several views.

DETAILED DESCRIPTION

As will be described in detail here, systems and methods for routing optical beams involve the use of mirrors. In routing the optical beams, a first optical beam, which can include an information signal, is propagated so that the first optical beam is reflected by a first steerable mirror prior to being reflected by a second steerable mirror. A second optical beam is propagated so that it is reflected by the second mirror prior to being reflected by the first mirror. The first and second mirrors are then oriented so that the first optical beam and the second optical beam are coincident upon both the first and second mirrors. By ensuring that the first and second optical beams are coincident upon each of the mirrors, optimal coupling of the first optical beam into a transmission medium aligned with the second optical beam can be achieved.

Figure 1:
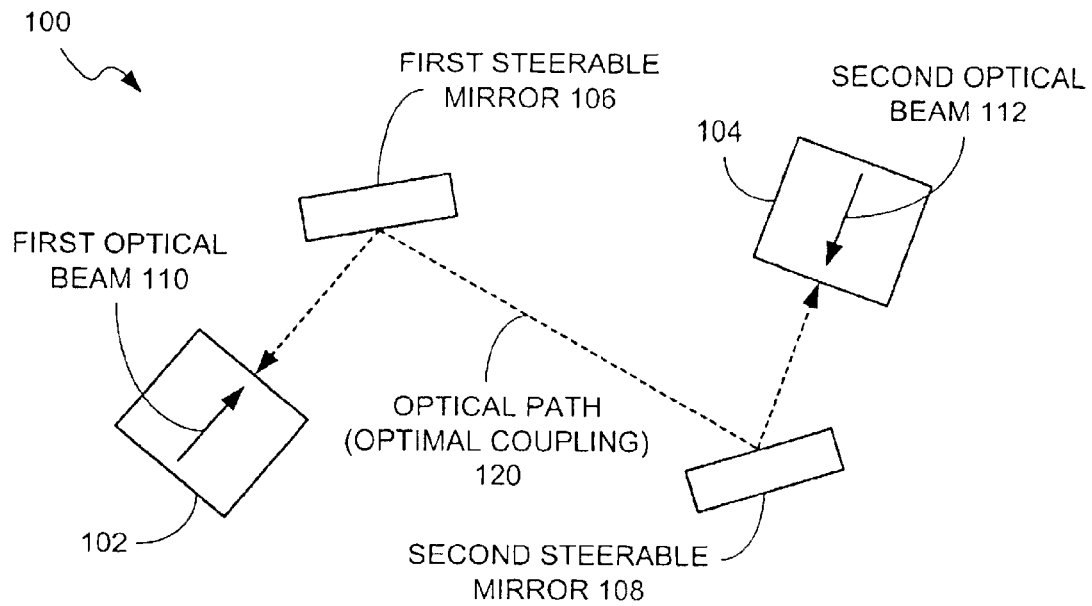
FIG. 1 is a schematic diagram of an embodiment of a system for routing an optical beam.

Referring now to the drawings, FIG. 1 is a schematic diagram of an embodiment of a system for routing an optical beam. As shown in FIG. 1, system 100 includes a first optical source 102, a second optical source 104, a first steerable mirror 106 and a second steerable mirror 108.

The first optical source 102 outputs a first optical beam 110, which can include an information signal. The first optical beam 110 is directed toward the first steerable mirror 106. The first optical beam is reflected by the first mirror 106 and then by the second mirror 108, which directs the first optical beam toward the second optical source 104.

A second optical beam 112 is output by the second optical source 104 and is directed to the second mirror 108. The second optical beam is reflected by the second mirror 108 and then by the first mirror 106, which directs the second optical beam toward the first optical source 102.

In operation, the orientation of one or both mirrors 106, 108 is adjusted so that the first optical beam and the second optical beam are coincident at both of the mirrors 106, 108. Once the first and second optical beams are coincident at each of the mirrors, the first optical beam 110 and the second optical beam 112 propagate along the same optical path (120). This orientation of the mirrors 106, 108 ensures maximum optical coupling of the first optical beam 110 into a transmission medium aligned with the second optical beam outport by the second optical source 104. Thus, this orientation results in minimal loss of an information signal that may be carried by first optical beam 110.

Detection of the first and second optical beams 110, 112 at the mirrors 106, 108 is accomplished by photodetectors, the outputs of which are used for adjusting the orientations of the mirrors. Embodiments of photodetectors will be described in detail later.

Figure 2:
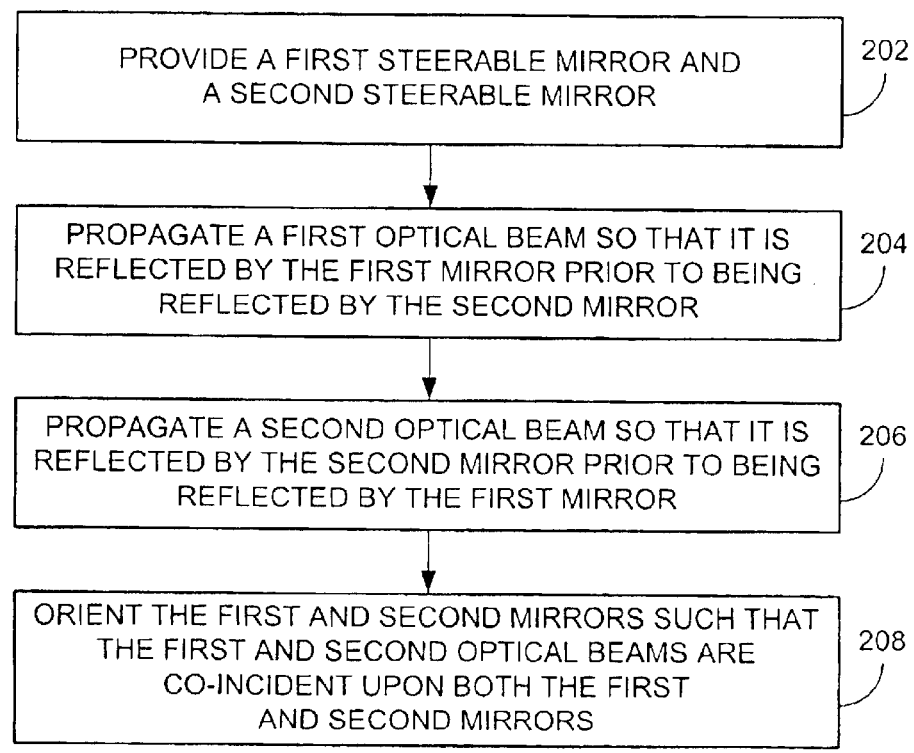
FIG. 2 is a flowchart depicting functionality of the embodiment of FIG. 1.

Functionality of the system of FIG. 1 will now be described with respect to the flowchart of FIG. 2. As shown in FIG. 2, the functionality (or method) may be construed as beginning at block 202, where a first steerable mirror and a second steerable mirror are provided. In block 204, a first optical beam is propagated so that it is reflected by the first mirror prior to being reflected by the second mirror. In block 206, a second optical beam is propagated so that it is reflected by the second mirror prior to being reflected by the first mirror. Then, in block 208, the first and second mirrors are oriented so that the first and second optical beams are coincident upon both the first and second mirrors.

Figure 3:
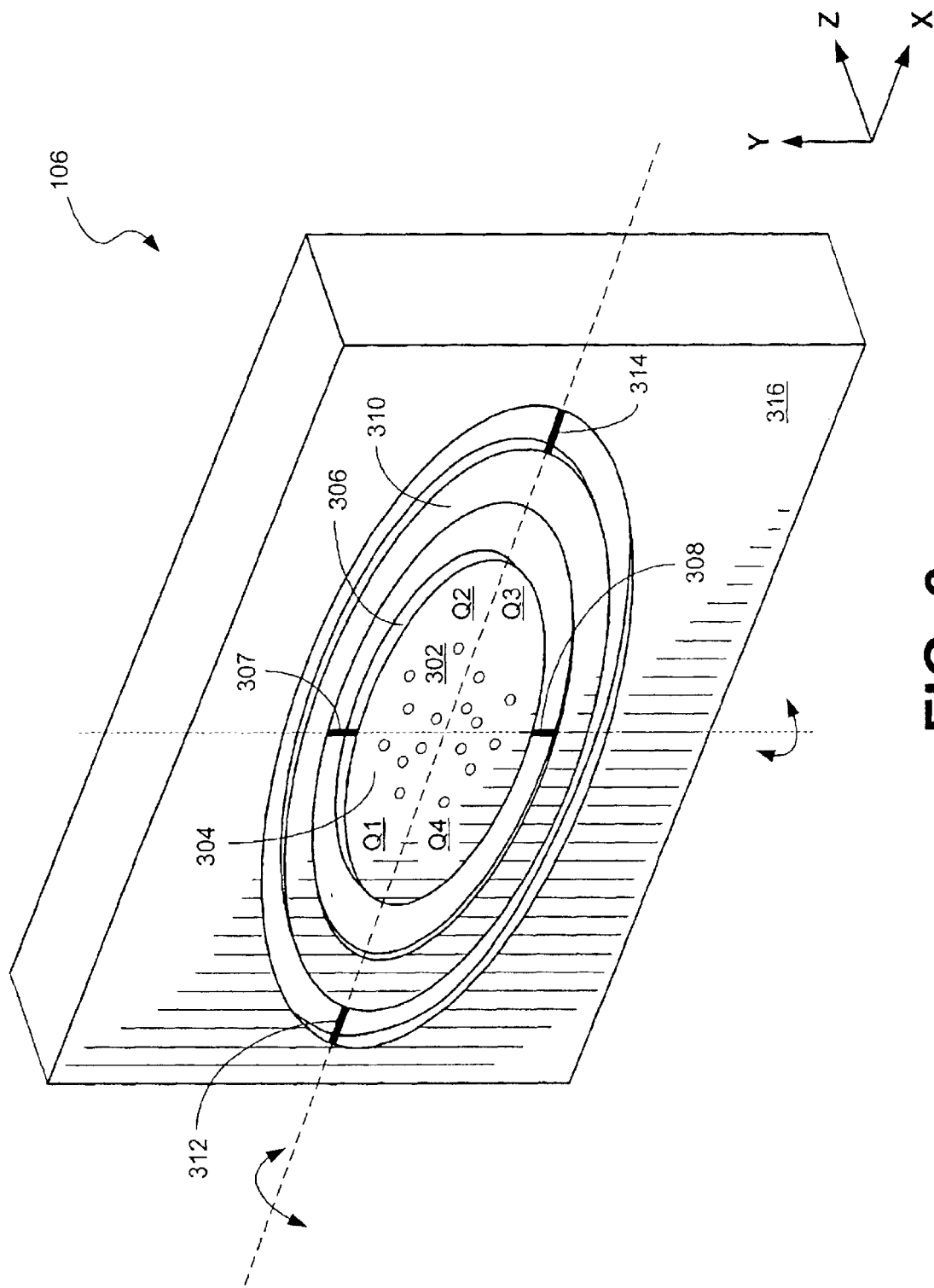
FIG. 3 is a perspective view of an embodiment of a steerable mirror used in the system FIG. 1.
Figure 4:
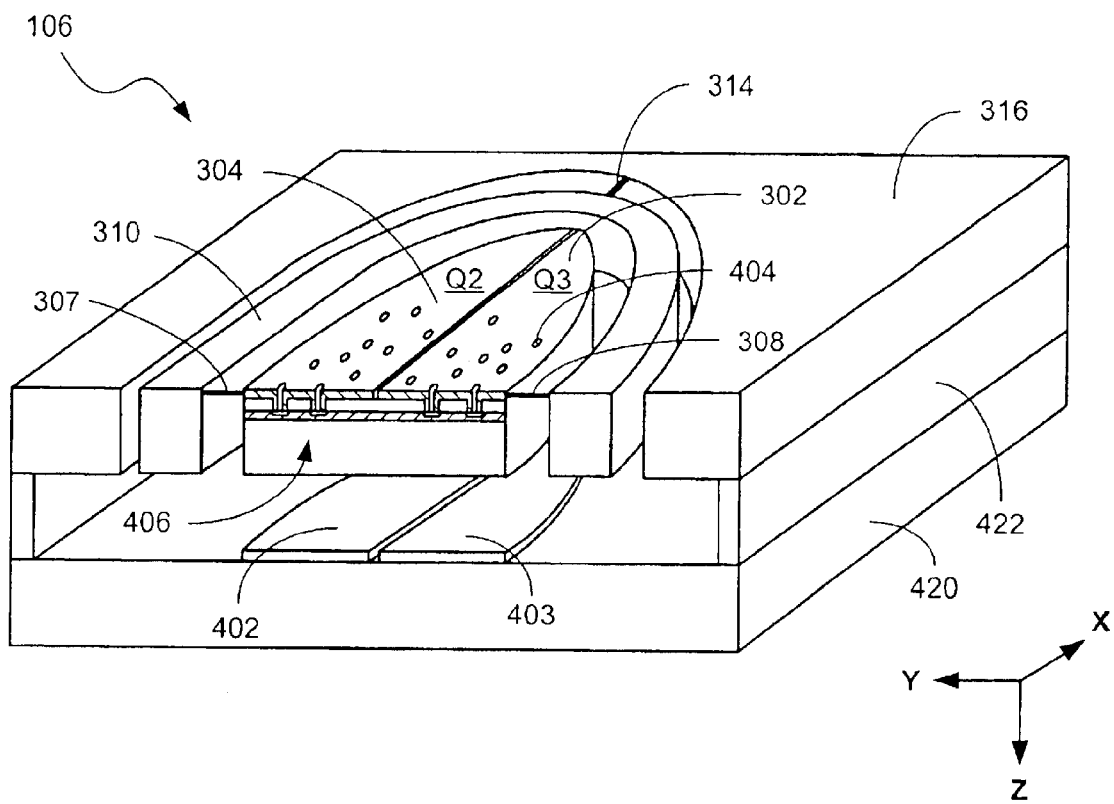
FIG. 4 is a schematic view of the mirror of FIG. 3.
Figure 5:
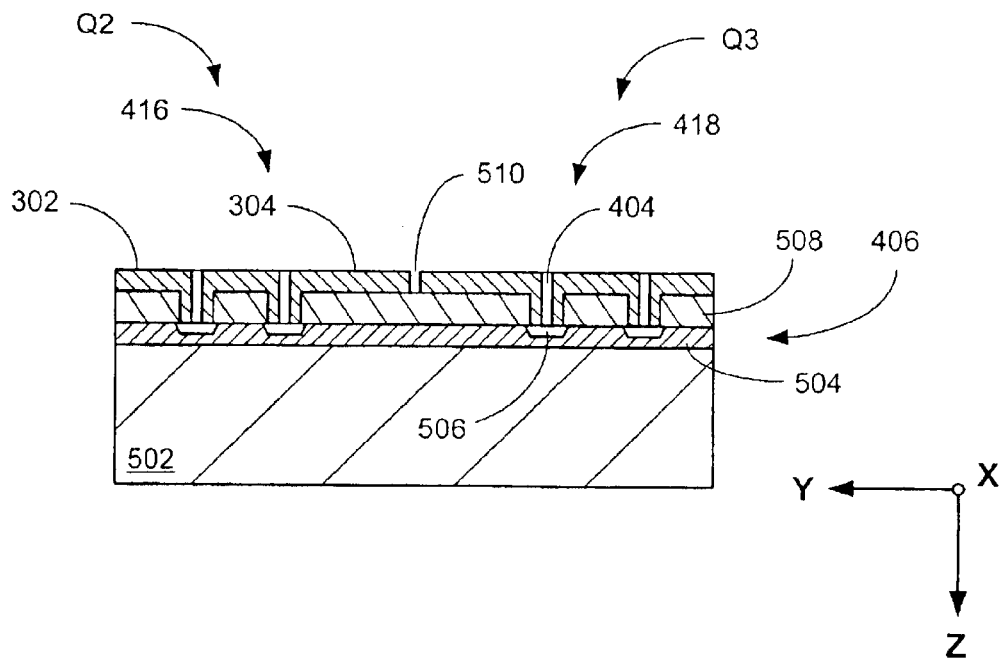
FIG. 5 is a cross-sectional view of a portion of the mirror of FIG. 4.

Referring now to FIGS. 3–5, an embodiment of a steerable mirror will be described in greater detail. Specifically, FIG. 3 is a perspective view of steerable mirror 106 of FIG. 1. As shown in FIG. 3, mirror 106 includes a micromirror 302 that is rotatable about two axes of rotation, i.e., the X-axis and the Y-axis. The micromirror 302 includes reflective material 304 on a major exterior surface. The reflective material 304 is layered on a support 306, which can be made of polysilicon or single crystal silicon, for example. The support 306 is connected by torsional flexures 307, 308 to a movable frame 310. The flexures 307 and 308 allow the micromirror 302 to rotate about the X-axis. The movable frame 310 is rotatable about the Y-axis by using flexures 312 and 314, which rotabably connect the moveable frame to a fixed frame 316.

Movement of the micromirror 302 and movable frame 310 is caused by electrodes that are located behind the micromirror. Two of these electrodes 402, 403 are depicted in FIG. 4. The electrodes are activated in response to signals corresponding to the positions at which the first optical beam and second optical beam are incident upon the mirror 106. In other embodiments, other methods are used for moving the micromirror, such as using a surface drive.

Electrodes 402, 403 are located on an insulating layer 420, with a spacer layer 422 being located between the fixed frame 316 and the insulating layer 420. The spacer layer 422 provides clearance so that the micromirror 302 and movable frame 310 can move in response to an electric field applied by the electrodes.

As shown in FIGS. 4 and 5, reflective material 304 includes a number of openings 404. The openings 404 allow light from an optical beam to propagate to segments of a segmented photodetector 406. The openings are sized and of sufficient number to allow a predetermined level of the light incident on the reflective material 304 to pass through to the segmented photodetector. By way of example, approximately five percent of the light incident upon the reflective surface is allowed to pass to the photodetector. Note that each quadrant of the micromirror 302 has an aggregate area of openings equal to each of the other quadrants. Also note that the openings are randomly positioned in the reflective layer to minimize effects of defraction. In other embodiments, the openings can be located in uniform patterns.

In the embodiment of FIGS. 3–5, the micromirror 302 that forms part of mirror 106 is divided into four quadrants Q1, Q2, Q3, Q4, with each of four segments of the segmented photodetector (416 and 418 of which are shown) corresponding to a different one of the quadrants.

In operation, when the first optical beam is incident upon micromirror 302, a portion of the light is reflected along the optical path. In this case, ninety-five percent of the light of the first optical beam is reflected. The remaining five percent of the light passes through the openings 404 and is incident upon the segmented photodetector 406. Thus, each of the photodetector segments generates a detection signal in response to the light of the first optical beam being incident thereon.

Similarly, when the second optical beam is incident upon mirror 106, a portion of the light is reflected and the remaining portion passes through the openings 404. Each of the photodetector segments also generates a detection signal in response to the second optical beam being incident thereon.

Note that detection signals also are generated by the photodetector segments of the micromirror that forms a part of mirror 108. Specifically, the photodetector segments generate detection signals corresponding to the position of incidence of each of the first and second optical beams upon the micromirror of the mirror 108.

The detection signals are used to generate control inputs for mirrors 106 and 108 so that the mirrors can be oriented to ensure that the first optical beam and the second optical beam are coincident at both of the mirrors. In some embodiments, the desired positions of co-incidence are centered positions of the mirrors. In such a case, if the segmented photodetector 406 detects either optical beam in a position that is not centered, the detection signals generated by the segmented photodetector 406 are used to generate control inputs for orienting one or both steerable mirrors 106, 108 so that the optical beam becomes centered.

Referring specifically to FIG. 5, which is a cross-sectional view of the micromirror 302, it is shown that segmented photodetector 406 is composed of a semiconductor substrate 502 and a semiconductor layer 504 that includes p+ regions 506. The p+ regions 506 are aligned with the openings 404. An insulating layer 508 is located on the semiconductor substrate 502, and the reflective material 304 is located on the insulating layer. The reflective material 304 electrically contacts the p+ regions 506 and, thus, provides an electrode of the segmented photodetector 406. Demarcation between the segments, e.g., segments 416, 418, is provided by a gap 510 in the reflective material.

The semiconductor substrate 502 may be made of n+ silicon, for example. The semiconductor layer 504 may be, for example, a layer of more lightly doped n silicon located on the semiconductor substrate 502. The p+ regions 506 are each formed in the semiconductor layer 504.

Figure 6:
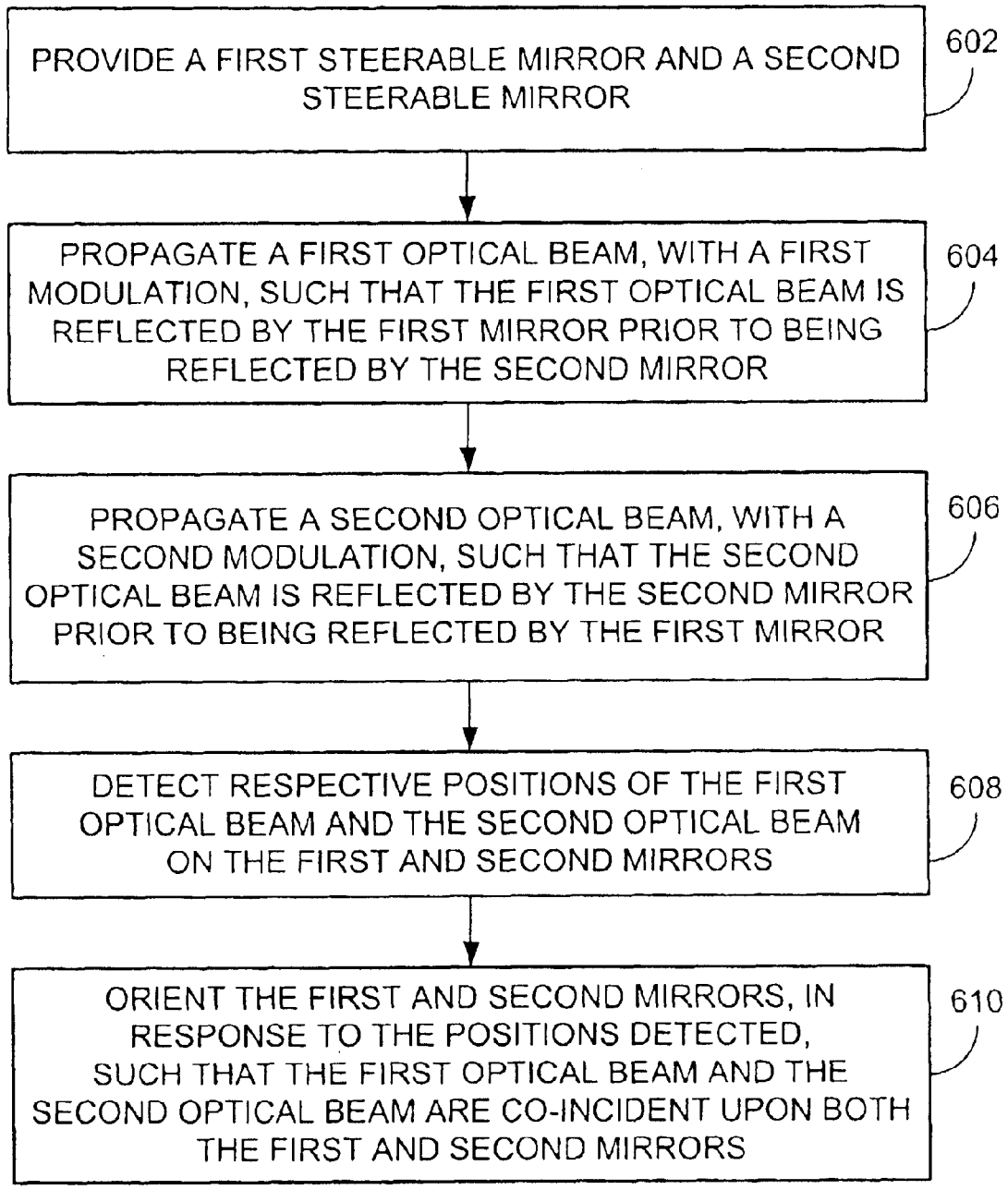
FIG. 6 is a flowchart depicting functionality of another embodiment of a system for routing an optical beam.

FIG. 6 is a flowchart depicting functionality of another embodiment of a system for routing optical beams. Specifically, the embodiment of FIG. 6 uses first and second optical beams that are modulated at different frequencies so that the optical beams are individually detectable and, thus, distinguishable from each other.

As shown in FIG. 6, the functionality (or method) may be construed as beginning at block 602, where first and second steerable mirrors are provided. In block 604, a first optical beam modulated with a first modulation is propagated so that it is reflected by the first mirror prior to being reflected by the second mirror. In block 606, a second optical beam modulated with a second modulation is propagated so that it is reflected by the second mirror prior to being reflected by the first mirror. In block 608, respective positions of the first optical beam and the second optical beam are detected on each of the mirrors. Then, in block 610, the mirrors are oriented so that the first optical beam and the second optical beam are coincident upon both the first and second mirrors.

Figure 7:
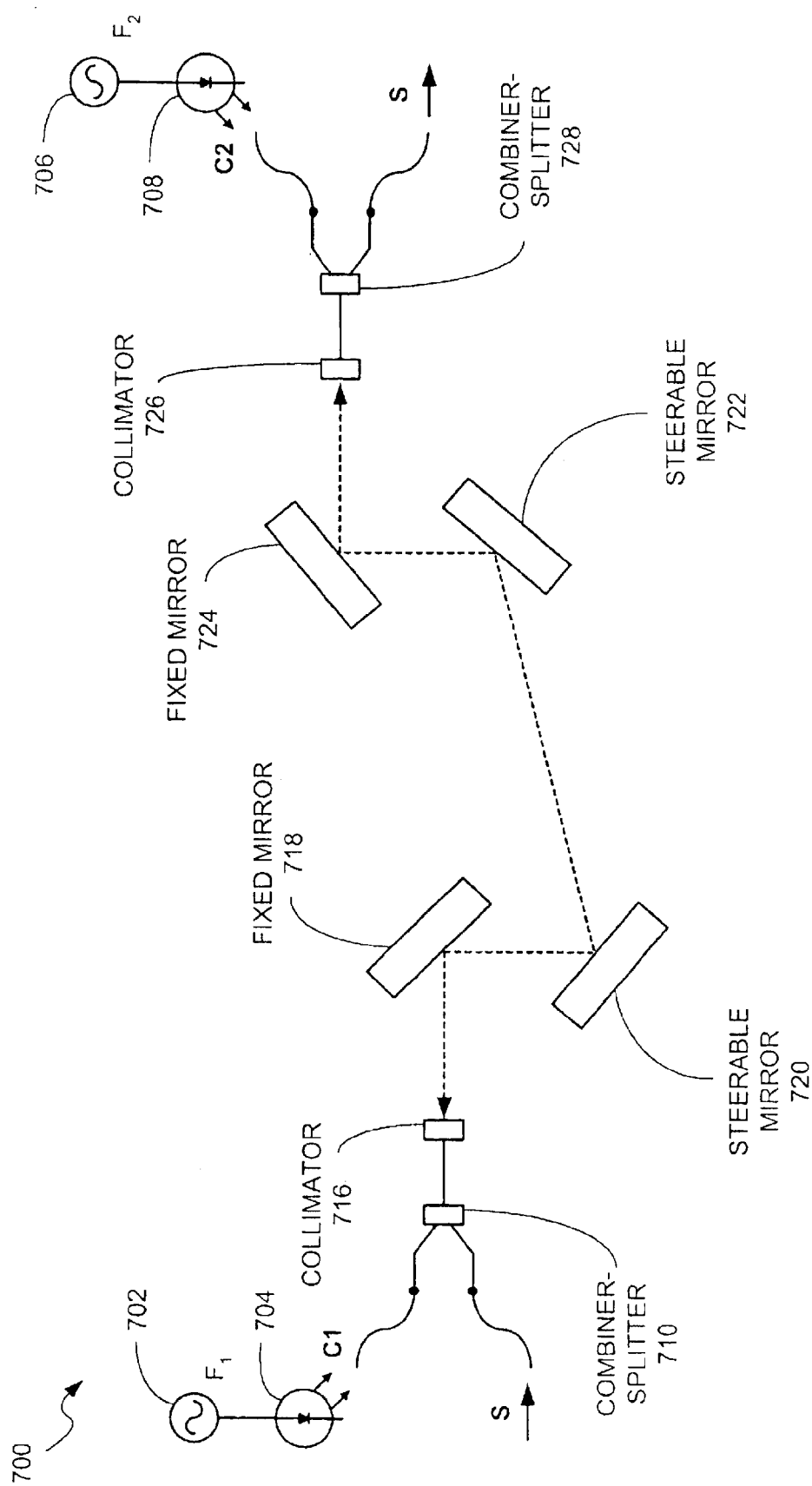
FIG. 7 is a schematic diagram of another embodiment of a system for routing an optical beam.

An embodiment of a system that uses amplitude-modulated optical beams with different modulation frequencies will now be described with respect to the schematic diagram of FIG. 7. As shown in FIG. 7, system 700 includes an oscillator 702 that generates an oscillation signal at a frequency $f_1$ and which outputs the oscillation signal to a light source 704. Light source 704 is amplitude-modulated at the frequency $f_1$. Another oscillator 706 generates an oscillation signal at a frequency $f_2$ and which outputs the oscillation signal to a second light source 708. Light source 708 is amplitude-modulated at the frequency $f_2$.

Light source 704 emits a first optical beam C1 and the light source 708 emits a second optical beam C2. The optical beams C1 and C2 propagate along an optical path defined by system 700. Note, however, that the optical beam C2 propagates along the optical path in reverse compared to the optical beam C1. An optical beam S modulated with an information signal also propagates along the optical path with the optical beam C1. In this embodiment, optical beam S is a different wavelength than the wavelength of either of the optical beams C1 or C2.

Optical beam S and optical beam C1 are provided to a combiner-splitter 710 via optical fibers 712 and 714, respectively. The combiner-splitter 710 combines the optical beams C1 and S and provides a combined optical beam SC1 to a collimator 716. From collimator 716, the combined optical beam SC1 is propagated to a first fixed mirror 718 that reflects the combined optical beam SC1 to a first steerable mirror 720. The first steerable mirror 720 reflects the combined optical beam SC1 to a second steerable mirror 722, which then reflects the combined optical beam SC1 to a second fixed mirror 724. The second fixed mirror 724 reflects the combined optical beam SC1 to a second collimator 726 that provides the combined optical beam SC1 to a second combiner-splitter 728. The combiner-splitter 728 separates the optical beam S from the optical beam C1 and provides the optical beam S as an output.

Each of the fixed mirrors 718, 724 includes a partially-reflective mirror and a photodetector. Specifically, the first fixed mirror 718 includes a segmented photodetector (not shown) that detects the second optical beam C2, and the second fixed mirror includes a segmented photodetector (not shown) that detects the first optical beam C1. As described in reference to the previous embodiments, the segments of the photodetectors generate detection signals that are used to provide control beams to a corresponding steerable mirror.

In this embodiment, detection signals generated by the segmented photodetector of the first fixed mirror 718 are used to provide control inputs for the second steerable mirror 722, and detection signals provided by the segmented photodetector of the second fixed mirror 726 are used to provide control inputs for the first steerable mirror 720. The steerable mirrors are oriented in response to the control inputs so that the first and second optical beams are incident upon the first fixed mirror at a common position, and are also incident upon the second fixed mirror at a common position. This orientation ensures optimal optical coupling of the optical beam S into the collimator 726.

Figure 8:
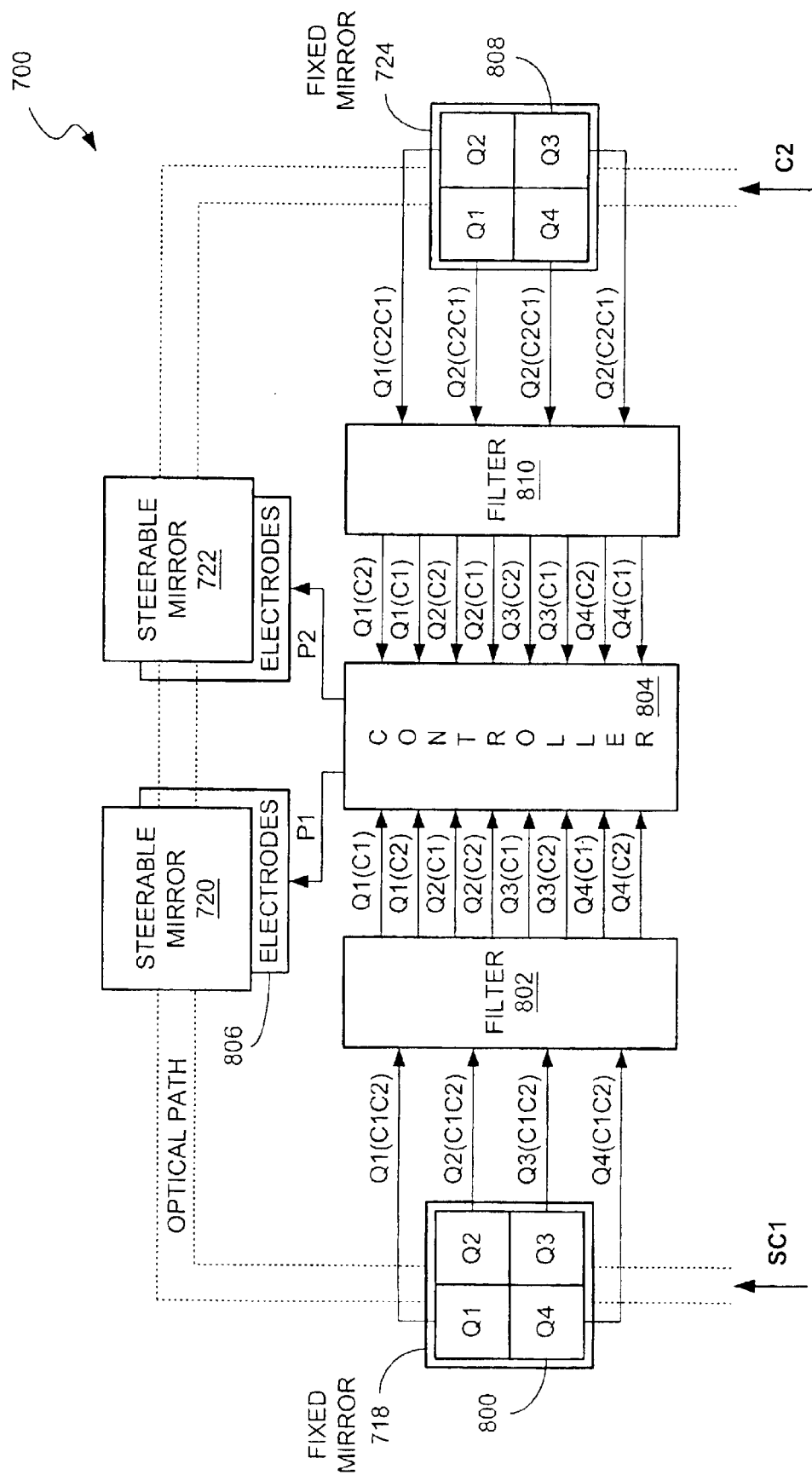
FIG. 8 is a schematic diagram depicting detection and control signals associated with the system of FIG. 7.

FIG. 8 is a schematic diagram that depicts the use of detection signals generated by the photodetectors of the embodiment of FIG. 7 for controlling the steerable mirrors 720, 722. As shown in FIG. 8, each segment of each photodetector provides an output corresponding to the optical beams detected at that photodetector. The outputs are then provided to corresponding filters, which distinguish between the first and second optical beams. By way of example, the first fixed mirror 718 outputs beam Q1 (C1 C2) from quadrant 1 of the segmented photodetector 800, beam Q2 (C1 C2) from quadrant 2, beam Q3 (C1 C2) from quadrant 3 and beam Q4 (C1 C2) from quadrant 4. In response to the signals from the respective quadrants of the photodetector 800, the filter 802 outputs eight signals, each of which corresponds to the detected intensity level of either the first optical beam C1 or the second optical beam C2 at each quadrant of the photodetector. Thus, the filter outputs signals Q1 (C1) and Q1 (C2) corresponding to the first quadrant, beams Q2 (C1) and Q2 (C2) corresponding to the second quadrant, signals Q3 (C1) and Q3 (C2) corresponding to the third quadrant, and signals Q4 (C1) and Q4 (C2) corresponding to the fourth quadrant. These signals are provided to control 804 that provides a corresponding positioning signal P1 to the first steerable mirror 720. Note, the positioning signal P1 is provided to electrodes 806 of the steerable mirror 720 to move the micromirror (not shown) of the mirror 720. Also note that the segmented photodetector 808 (fixed mirror 724) and filter 810 operate in a manner similar to that described with respect to the mirror 718 and filter 802, and will not be described in greater detail.

Figure 9:
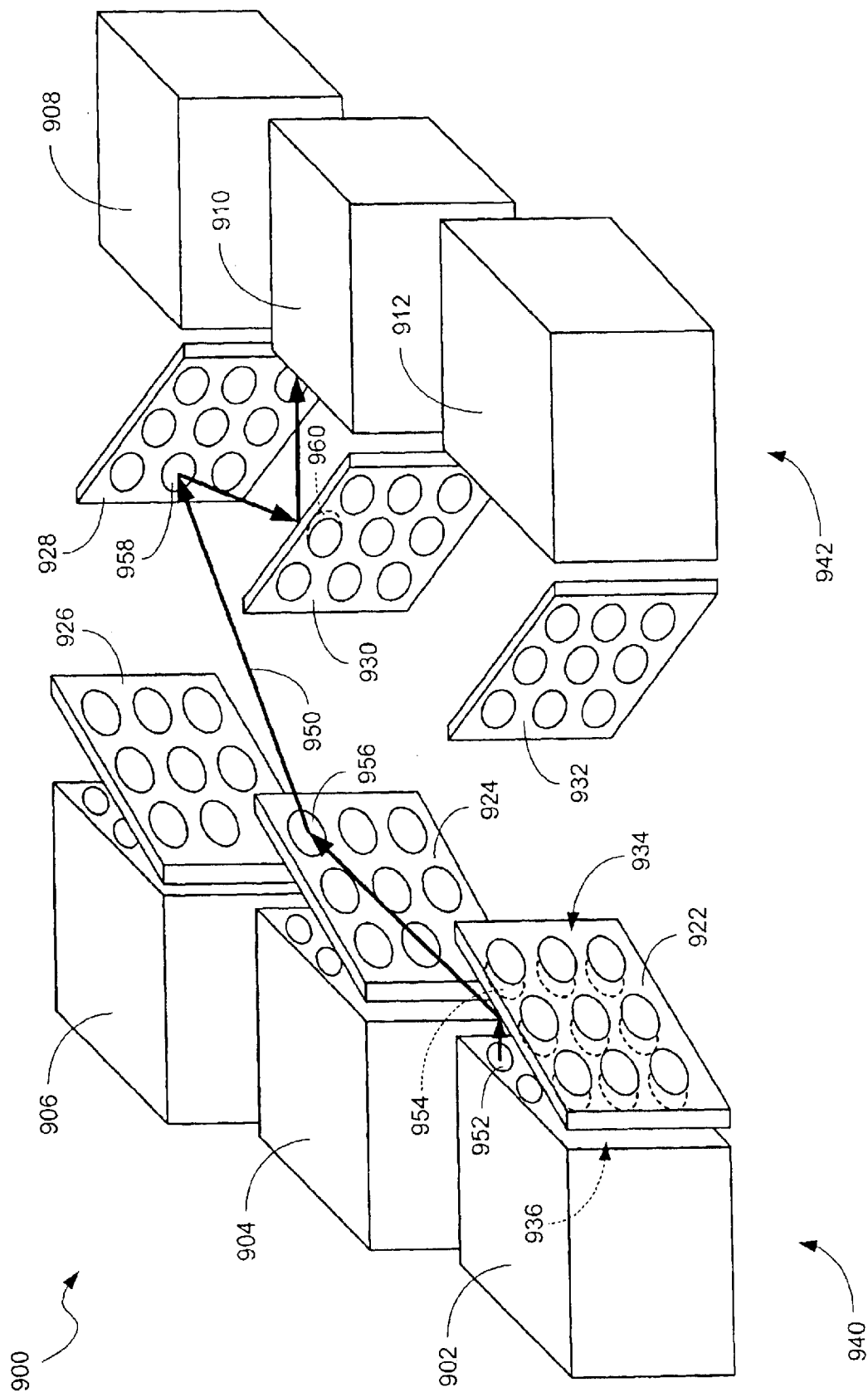
FIG. 9 is a schematic diagram of another embodiment of a system for routing an optical beam.

FIG. 9 is schematic diagram depicting a portion of an embodiment of a system for routing optical beams that includes an optical switching array 900. Optical switching array 900 incorporates multiple collimator arrays 902, 904, 906, 908, 910, 912, each of which optically communicates with a composite mirror array 922, 924, 926, 928, 930, 932, respectively. Each composite mirror array includes an array of steerable micromirrors on one side and an array of fixed mirrors on the other side. For example, composite mirror array 922 includes an array 934 of steerable micromirrors and an array 936 of fixed micromirrors. Each of the fixed micromirrors is associated with a segmented photodetector (not shown), such as described before.

In operation, the steerable micromirrors can be positioned to reflect an optical beam propagated from a first row of the array of collimators to a second row of the array of collimators. For instance, as depicted in FIG. 9, a first optical beam 950, which carries an information signal, is emitted from a collimator 952. The first optical beam 950 is reflected from a first fixed micromirror 954 that reflects the optical beam to a first movable micromirror 956. The first movable micromirror 956 reflects the first optical beam 950 to a second movable mirror 958, which then reflects the first optical beam 950 to a second fixed mirror 960. The second fixed mirror 960 reflects the optical beam to a second collimator (not shown) that is part of array 910. The second collimator provides the first optical beam 950 to an optical transmission medium (not shown).

A second optical beam, which is not shown in FIG. 9, is output from the second collimator of array 910 and is reflected from the micromirrors 954, 956, 958 and 960 in reverse order compared to the first optical beam 950. Positions of the first optical beam and second optical beam are detected at the movable micromirrors 956 and 958 and the orientations of the micromirrors are adjusted as required to ensure that the first and second optical beams are coincident at each of the micromirrors.

Figure 11:
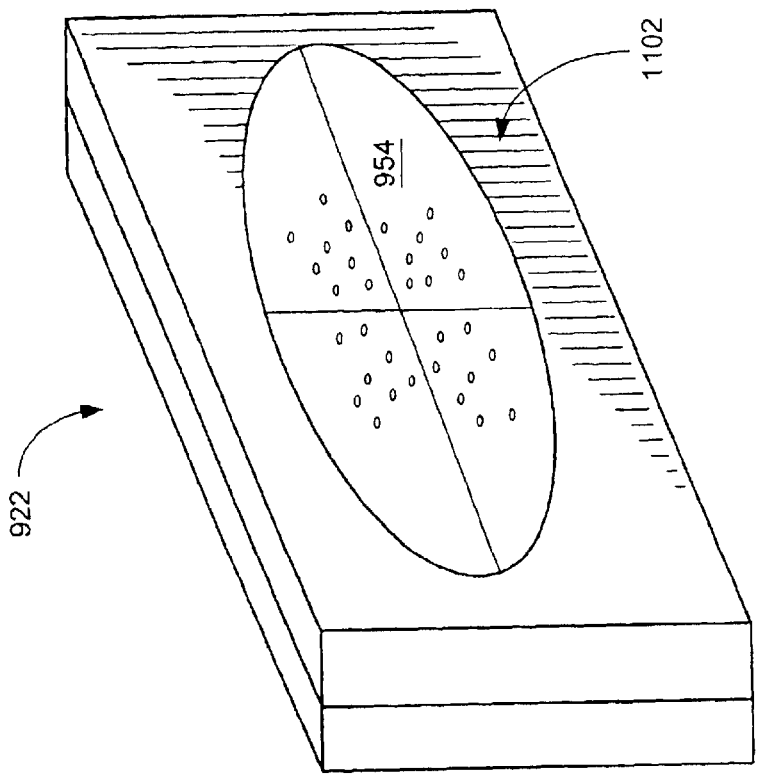
FIG. 11 is a perspective view of the composite mirror assembly of FIG. 10, showing a side of the assembly with a fixed mirror.
Figure 10:
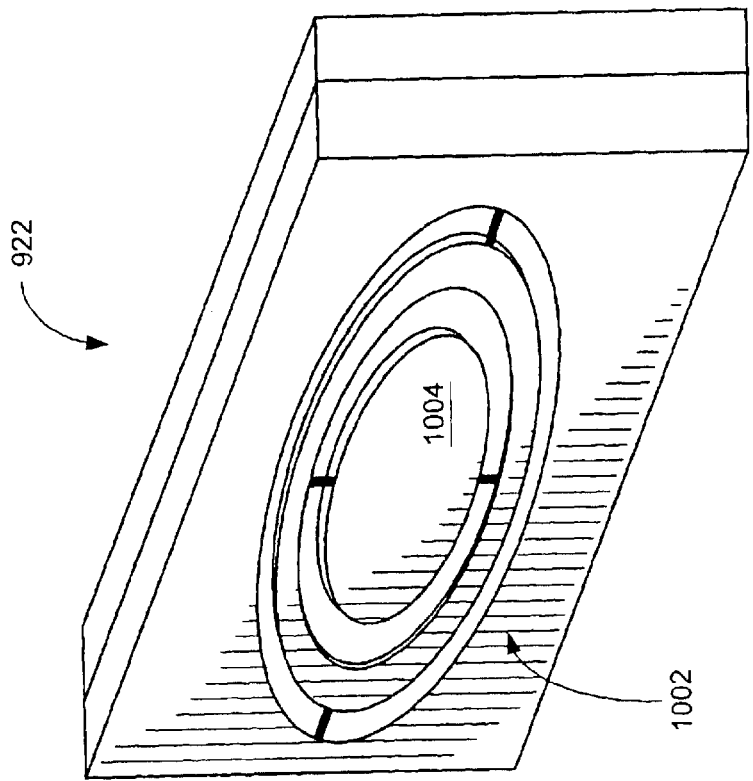
FIG. 10 is a perspective view of an embodiment of a composite mirror assembly, showing a side of the assembly with a steerable mirror.

FIGS. 10 and 11 depict a portion of composite mirror array 922 in greater detail. Specifically, the portion depicted in FIGS. 10 and 11 includes a steerable micromirror 1004 located on side 1002. An embodiment of a steerable micromirror was described before with respect to FIG. 3 and will not be described in detail here. Additionally, a fixed micromirror 954 is located on side 1102. An embodiment of a fixed micromirror was described before with respect to FIG. 4 and also will not be described in detail here.

It should be emphasized that many variations and modifications may be made to the above-described embodiments.

All such modifications and variations are intended to be included herein within the scope of this disclosure and protected by the following claims.

What is claimed is:

1. A method for routing a first optical beam, the method comprising:

providing a first mirror and a second mirror, both of which are steerable;

providing a second optical beam;

propagating the first optical beam such that the first optical beam is reflected by the first mirror prior to being reflected by the second mirror;

propagating the second optical beam such that the second optical beam is reflected by the second mirror prior to being reflected by the first mirror; and orienting the first mirror and the second mirror such that the first and second optical beams are coincident at both the first mirror and the second mirror.

2. The method of claim 1, wherein:

the method additionally comprises:

detecting a position of the first optical beam on each of the mirrors;

detecting a position of the second optical beam on each of the mirrors; and in orienting the first mirror and the second mirror, the mirrors are oriented in response to the positions detected.

3. The method of claim 2, wherein, in orienting the first mirror and the second mirror, the first and second optical beams are positioned to be coincident at centered positions of the mirrors.

4. The method of claim 2, wherein:

each of the first and the second mirrors comprises a partially-reflective surface and a photodetector, the partially-reflective surface being operable to reflect a portion of light incident thereon and to pass through the remainder of the light to the photodetector; and detecting positions of the first and second optical beams is accomplished using the photodetectors.

5. The method of claim 1, wherein:

the method additionally comprises:

providing a first fixed mirror; and in propagating the first optical beam, the first optical beam is reflected by the first fixed mirror prior to being reflected by the first steerable mirror.

6. The method of claim 5, wherein:

the method additionally comprises:

providing a second fixed mirror; and in propagating the second optical beam, the second optical beam is reflected by the second fixed mirror prior to being reflected by the second steerable mirror.

7. The method of claim 1, wherein the first optical beam and the second optical beam differ in wavelength.

8. The method of claim 1, wherein the first optical beam is modulated at a first frequency and the second optical is modulated at a second frequency that is different than the first frequency.

9. The method of claim 1, wherein the first optical beam carries an information signal.

10. A system for routing a first optical beam, the system comprising:

a first steerable mirror;

a second steerable mirror located to communicate optically with the first steerable mirror; and a controller operable in response to information indicating respective positions of incidence of first and second optical beams on each of the first and second steerable mirrors and to provide control signals to orient the first and second steerable mirrors to locate the first and second optical beams coincidentally at both the first and second steerable mirrors.

11. The system of claim 10, wherein the controller is operable to locate the first and second optical beams coincidentally at centered positions of the first and second steerable mirrors.

12. The system of claim 10, wherein:

each of the first and second steerable mirrors comprises a partially-reflective surface and a photodetector, each partially-reflective surface being operable to reflect a portion of light incident thereon and to pass the remainder of the light to the photodetector, each photodetector being operable to provide information corresponding to the respective positions of the first and second optical beams to the controller.

13. The system of claim 12, wherein:

the first steerable mirror comprises a rotatable micromirror and a set of electrodes;

the set of electrodes is electrically connected to receive the control signals from the controller.

14. The system of claim 10, further comprising:

a first fixed mirror optically communicating with the first steerable mirror, the first fixed mirror being located such that the first optical beam is reflected by the first fixed mirror prior to being reflected by the first steerable mirror.

15. The system of claim 14, further comprising:

a second fixed mirror optically communicating with the second steerable mirror, the second fixed mirror being located such that the second optical beam is reflected by the second fixed mirror prior to being reflected by the second steerable mirror.

16. The system of claim 15, wherein:

each of the first and second fixed mirrors comprises a partially-reflective surface and a photodetector, each partially-reflective surface being operable to reflect a portion of light incident thereon and to pass the remainder of the light to the photodetector, each photodetector being operable to provide information corresponding to the respective positions of the first and second optical beams to the controller.

17. The system of claim 10, further comprising:

a first modulator operable to modulate the first optical beam at a first frequency; and a second modulator operable to modulate the second optical beam at a second frequency that is different than the first frequency.

18. The system of claim 10, further comprising:

an optical combiner located to receive the first optical beam and an information beam, the optical combiner being operable to combine the first optical beam and the information beam optically such that the first optical beam carries the information beam.

19. The system of claim 10, further comprising:

means for optically combining the first optical beam and an information beam such that the first optical beam carries the information beam.

* * * * *